(12) United States Patent
Tsai

(10) Patent No.: US 8,167,369 B2
(45) Date of Patent: May 1, 2012

(54) CUSHION STRUCTURE FOR BICYCLE

(75) Inventor: An-Ting Tsai, Changhwa Hsien (TW)

(73) Assignee: Foming Bicycle Parts Co., Ltd., Changhwa Hsien (TW)

( * ) Notice: Subject to any disclaimer, the term of this patent is extended or adjusted under 35 U.S.C. 154(b) by 141 days.

(21) Appl. No.: 12/753,546

(22) Filed: Apr. 2, 2010

(65) Prior Publication Data

US 2011/0241389 A1    Oct. 6, 2011

(51) Int. Cl.
*B60N 2/40* (2006.01)
*B62J 1/08* (2006.01)
*F16D 1/00* (2006.01)
*F16D 1/04* (2006.01)
*F16D 1/068* (2006.01)
*F16D 1/10* (2006.01)

(52) U.S. Cl. ............ 297/195.1; 403/354; 403/364

(58) Field of Classification Search ............ 297/195.1; 403/354, 361, 364
See application file for complete search history.

(56) References Cited

U.S. PATENT DOCUMENTS

| 674,752 | A | * | 5/1901 | Baker | 403/364 X |
|---|---|---|---|---|---|
| 2,156,395 | A | * | 5/1939 | Klouman | 403/364 X |
| 2,692,205 | A | * | 10/1954 | Greider et al. | 403/354 X |
| 4,103,966 | A | * | 8/1978 | Allen | 297/195.1 |
| 5,224,726 | A | * | 7/1993 | Gill | 297/195.1 X |
| 5,425,226 | A | * | 6/1995 | Kaufman | 403/354 X |
| 5,443,301 | A | * | 8/1995 | Lai | 297/195.1 |
| 5,499,858 | A | * | 3/1996 | Her | 297/195.1 |
| 5,695,241 | A | * | 12/1997 | Olsen et al. | 297/195.1 |
| 5,979,978 | A | * | 11/1999 | Olsen et al. | 297/195.1 X |
| 6,089,656 | A | * | 7/2000 | Hals | 297/195.1 X |
| 6,857,247 | B2 | * | 2/2005 | Adams | 403/354 X |
| 6,957,856 | B2 | * | 10/2005 | Chiang et al. | 297/195.1 |
| 7,841,654 | B1 | * | 11/2010 | Cardana | 297/195.1 |
| 8,001,725 | B2 | * | 8/2011 | Lhotak | 403/354 X |
| 2010/0066134 | A1 | * | 3/2010 | Goring | 297/195.1 |
| 2011/0049945 | A1 | * | 3/2011 | Mouri et al. | 297/195.1 |

* cited by examiner

*Primary Examiner* — Rodney B White
(74) *Attorney, Agent, or Firm* — Alan Kamrath; Kamrath IP Lawfirm, PA

(57) ABSTRACT

A cushion structure for a bicycle contains a body and a bottom tube. The body includes a circular inserting seat. The inserting seat includes a plurality of crossed support ribs extending radially from a center thereof and connecting with an outer rim thereof and formed in a cross shape. The bottom tube includes a connecting portion disposed on one end thereof. The connecting portion includes a circular inner hole corresponding to the inserting seat and includes a plurality of retaining slots formed therein corresponding to the support ribs.

9 Claims, 5 Drawing Sheets

CUSHION STRUCTURE FOR BICYCLE

BACKGROUND OF THE INVENTION

1. Field of the Invention

The present invention relates to a structure of a bicycle and, more particularly, to a cushion structure for a bicycle assembled by a bottom tube and a body directly.

2. Description of the Prior Art

Riding bicycles is a popular sport in recent years when people enjoy their leisure time to obtain exercise and environmental friendly purposes.

A conventional cushion of a bicycle includes a body and a support rod disposed on a bottom surface of the body, a locking member, and a seat post connected with the locking member and fixed to a frame of the bicycle. However, such a cushion is comprised of complicated components, is heavy, and consumes assembled time to increase production cost.

Therefore, an improved cushion of a bicycle has been developed and includes a body 3 as shown in FIG. 7. The body 3 includes a plurality of support ribs 31 and an integrally formed bottom tube 32, all of which are fixed on the bottom surface thereof.

However, such an improved cushion still has the following disadvantages:

1. The bottom tube 32 is integrally formed on the bottom surface of the body 3 that causes a weak strength, and it is inserted into a seat post of the frame to generate a weaker support capability. Therefore, when a rider sits on the cushion, the bottom tube deforms easily to lower safety and comfort.

2. The bottom tube 32 is integrally formed on the bottom surface of the body 3, so that bottom tubes with different lengths can not be replaced based on requirement.

The present invention has arisen to mitigate and/or obviate the afore-described disadvantages.

SUMMARY OF THE INVENTION

The primary object of the present invention is to provide a cushion structure for a bicycle that the body includes the inserting seat secured on the bottom surface thereof to fit the connecting portion of the bottom tube. The bottom tube is made of metal material. Hence, the bottom tube is inserted into the seat post of the frame to enhance reinforcement and prevent the bottom tube from deformation when a rider sits on a seat and, thus, rides the bicycle safely and comfortably.

Another object of the present invention is to provide a cushion structure for a bicycle that the body includes the inserting seat disposed on the bottom surface thereof for insertion into the connecting portion of the bottom tube. Accordingly, the bottom tubes with different lengths are replaced freely based on requirement.

To obtain the above objectives, a cushion structure for a bicycle provided by the present invention comprises a body and a bottom tube. The body includes a circular inserting seat. The inserting seat includes a plurality of crossed support ribs extending radially from a center thereof and connecting with an outer rim thereof and formed in a cross shape. The bottom tube includes a connecting portion disposed on one end thereof. The connecting portion includes a circular inner hole corresponding to the inserting seat and includes a plurality of retaining slots formed therein corresponding to the support ribs.

DETAILED DESCRIPTION OF THE PREFERRED EMBODIMENTS

Figure 1:
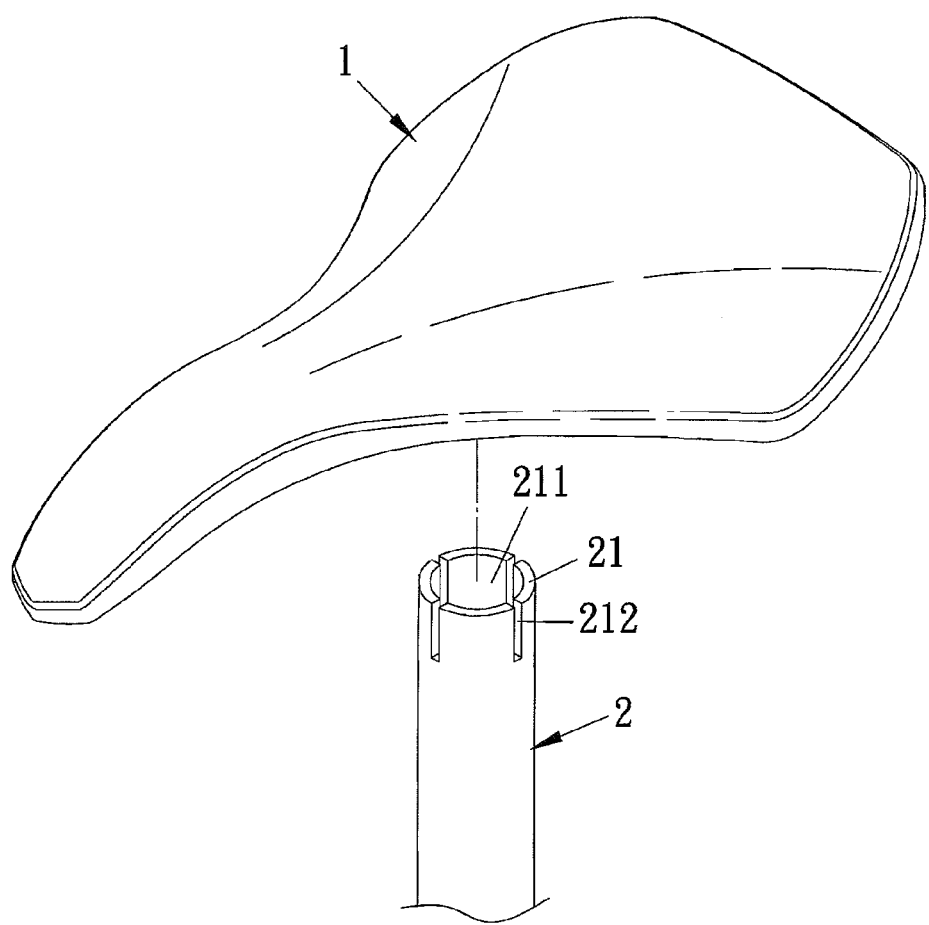
FIG. 1 is a perspective view showing the exploded components of a cushion structure for a bicycle according to a preferred embodiment of the present invention.
Figure 2:
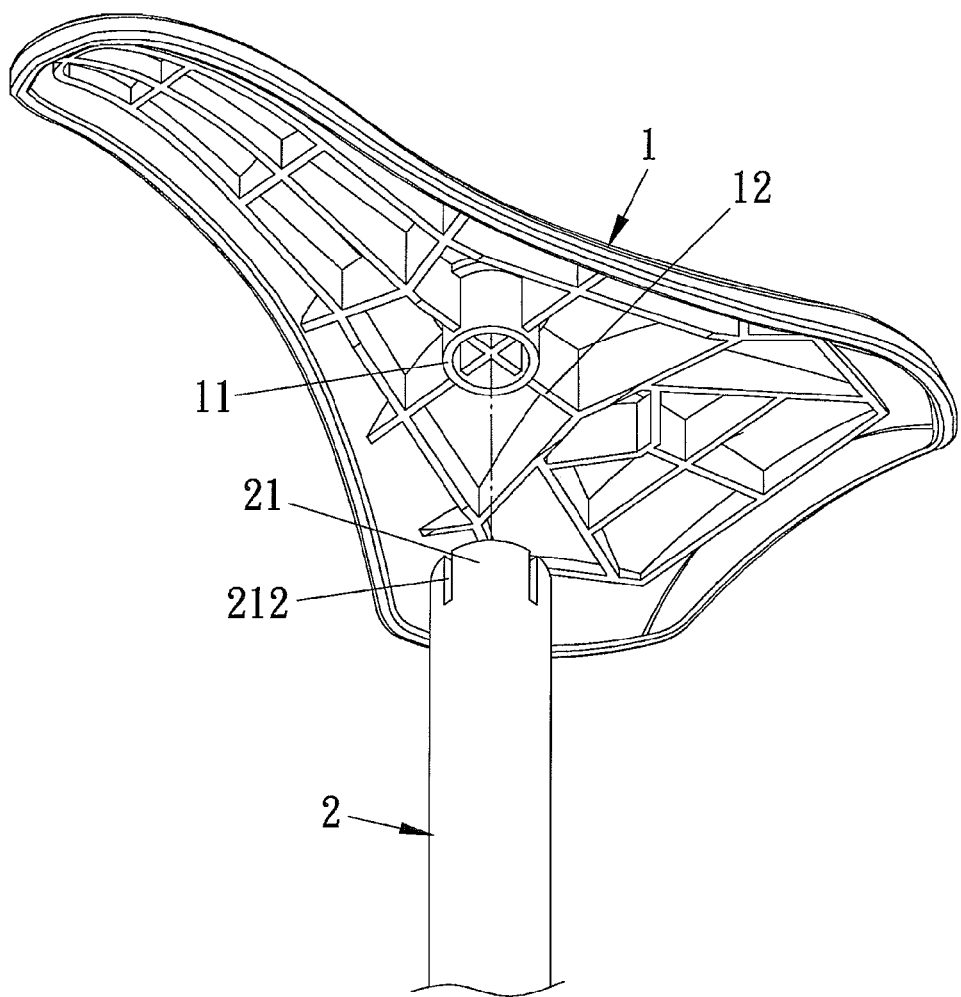
FIG. 2 is another perspective view showing the exploded components of the cushion structure for the bicycle according to the preferred embodiment of the present invention.
Figure 3:
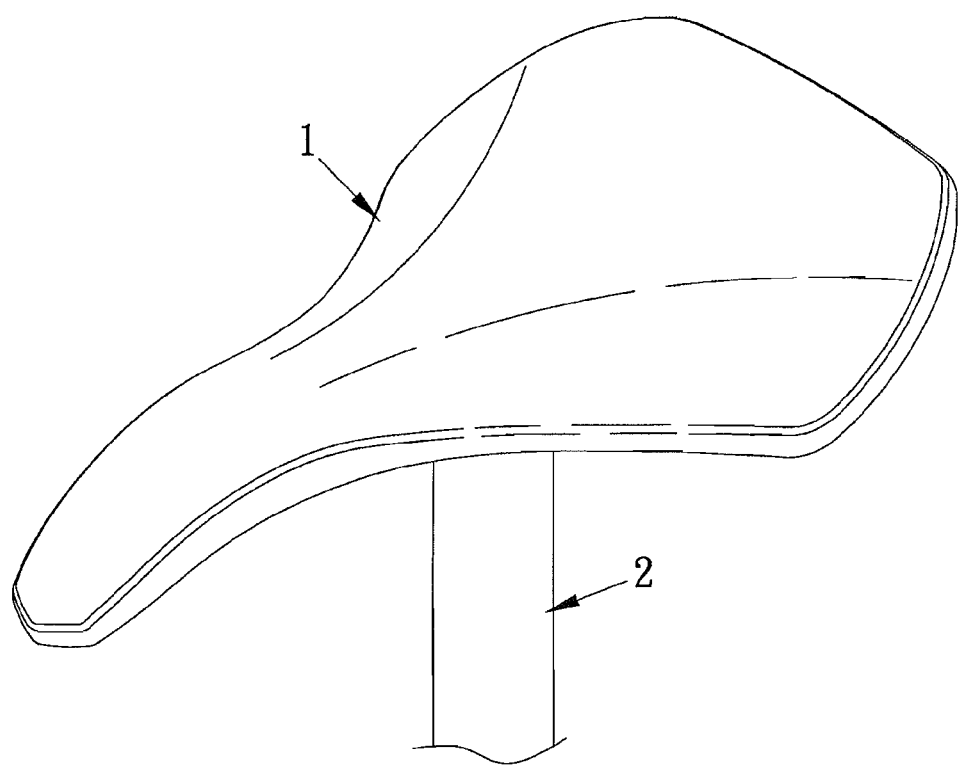
FIG. 3 is a perspective view showing the assembly of the cushion structure for the bicycle according to the preferred embodiment of the present invention.
Figure 4:
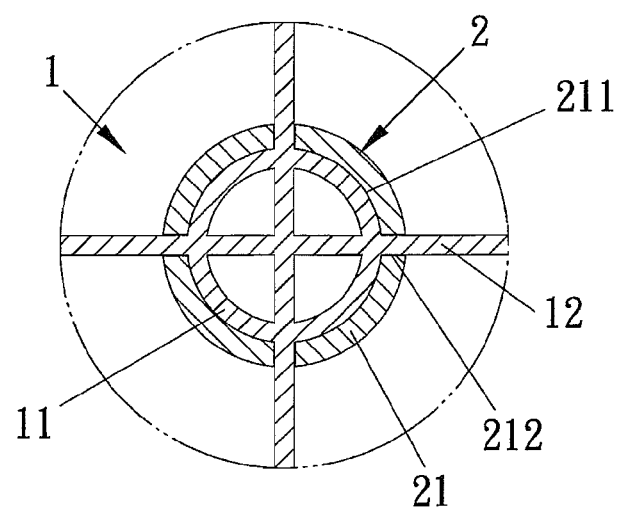
FIG. 4 is a cross sectional view showing a part of the assembly of the cushion structure for the bicycle according to the preferred embodiment of the present invention.

The present invention will be clearer from the following description when viewed together with the accompanying drawings, which show, for purpose of illustration only, the preferred embodiments in accordance with the present invention.

Referring to FIGS. 1-4, a cushion structure for a bicycle in accordance with a preferred embodiment of the present invention includes a body 1 and a bottom tube 2. The body 1 includes a circular inserting seat 11. The inserting seat 11 includes a plurality of crossed support ribs 12 extending radially from a center thereof and connecting with an outer rim thereof and formed in a cross shape. The bottom tube 2 includes a connecting portion 21 disposed on one end thereof. The connecting portion 21 includes a circular inner hole 211 corresponding to the inserting seat 11 and includes a plurality of retaining slots 212 formed therein corresponding to the support ribs 12.

In assembly, the connecting portion 21 of the bottom tube 2 is applied with glue, and the bottom tube 2 is inserted onto the inserting seat 11 by using the inner hole 211. Thus, the retaining slots 212 of the connecting portion 21 engage with the support ribs 12 of the inserting seat 11 securely and tightly. In operation, the body 1 is covered by a shock-absorbing layer and an outer layer, and the bottom tube 2 is inserted into a seat post of a frame to be sat on by a rider.

Figure 5:
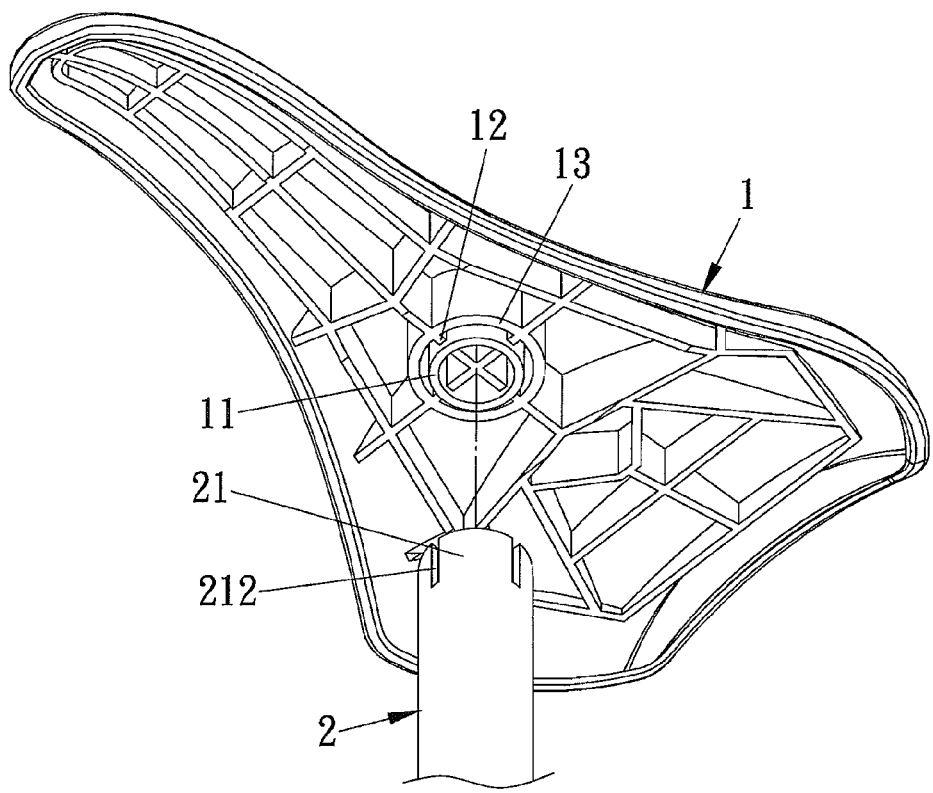
FIG. 5 is a perspective view showing the exploded components of a cushion structure for the bicycle according to another preferred embodiment of the present invention.
Figure 6:
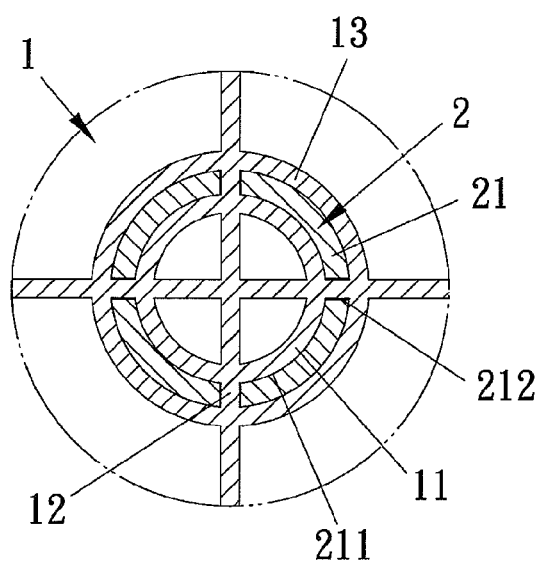
FIG. 6 is a cross sectional view showing a part of the assembly of the cushion structure for the bicycle according to the preferred embodiment of the present invention.
Figure 7:
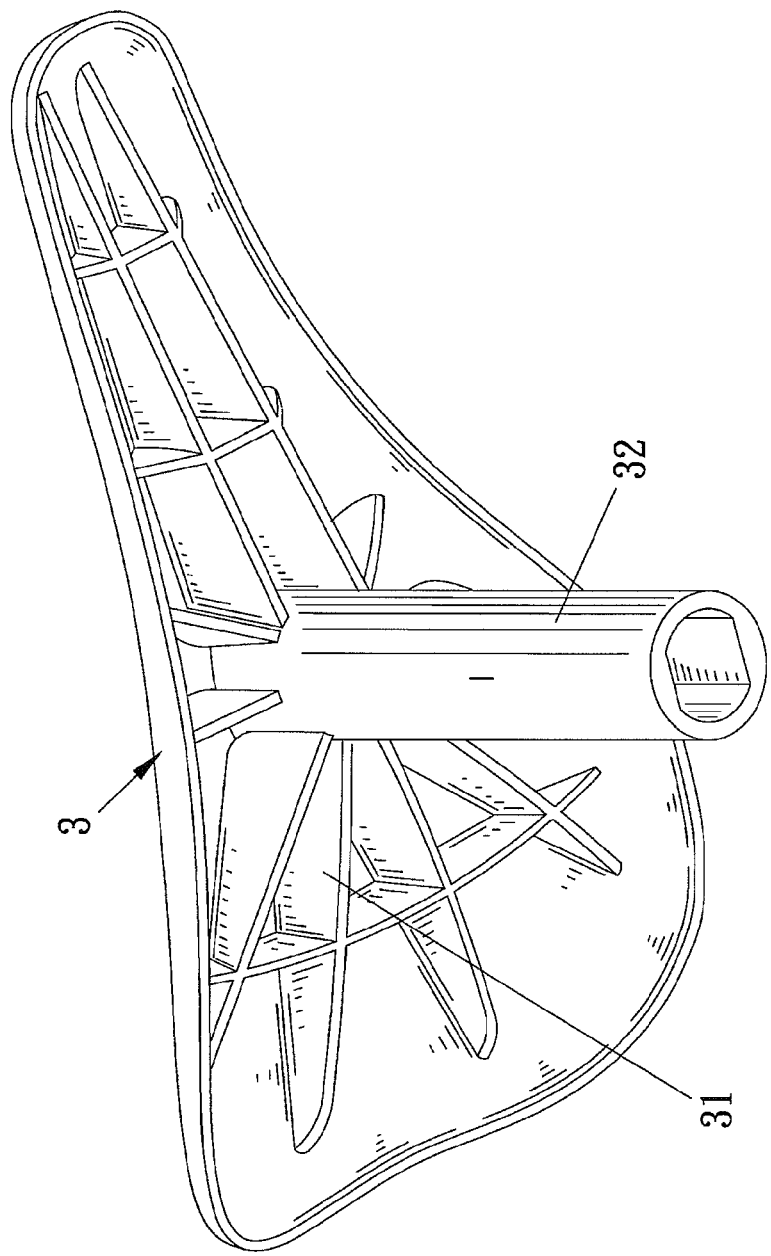
FIG. 7 is a perspective view of a conventional cushion structure for a bicycle.

Referring to FIGS. 5 and 6, a cushion structure for a bicycle in accordance with another preferred embodiment of the present invention comprises a body 1 and a bottom tube 2. The body 1 includes a circular inserting seat 11 fixed on a center of a bottom surface thereof. The inserting seat 11 includes a plurality of crossed support ribs 12 extending radially from a center thereof and connecting with an outer rim thereof and includes a fitting member 13 proximate to the outer rim thereof. The bottom tube 2 includes a connecting portion 21 disposed on one end thereof. The connecting portion 21 includes a circular inner hole 211 corresponding to the inserting seat 11 and includes a plurality of retaining slots 212 formed therein corresponding to the support ribs 12.

In assembly, the connecting portion 21 of the bottom tube 2 is applied with glue, and the bottom tube 2 is inserted onto the inserting seat 11 of the body 1 by using the inner hole 211. Thus, the retaining slots 212 of the connecting portion 21 engage with the support ribs 12 of the inserting seat 11, and the fitting member 13 is fitted to an outer side of the connecting portion 21 securely and tightly. In operation, the body 1 is covered by a shock-absorbing layer and an outer layer, and the bottom tube 2 is inserted into a seat post of a frame to be sat on by a rider.

Furthermore, the inserting seat 11 of the body 1 is formed in a cross or geometric shape, and the connecting portion 21 of the bottom tube 2 includes the inner hole 211 corresponding to the inserting seat 11.

The support ribs 12 of the body 1 can be also formed in an I shape, a horizontal I shape, or a radiation shape.

The bottom tube 2 can be also connected with the inserting seat 11 of the body 1 in a locking manner or by using a bolt and a bore to insert the bolt.

Thereby, the cushion structure of the present invention has the following advantages:

1. The body 1 includes the inserting seat 11 secured on the bottom surface thereof to fit the connecting portion 21 of the bottom tube 2, and the bottom tube 2 is made of metal material. Hence, the bottom tube 2 is inserted into the seat post of the frame to enhance reinforcement and prevent the bottom tube 2 from deformation when a rider sits on a seat and, thus, rides the bicycle safely and comfortably.

2. The body 1 includes the inserting seat 11 disposed on the bottom surface thereof for insertion into the connecting portion 21 of the bottom tube 2. Accordingly, the bottom tubes 2 with different lengths are replaced freely based on requirement.

While various embodiments in accordance with the present invention have been shown and described, it is clear to those skilled in the art that further embodiments may be made without departing from the scope of the present invention.

What is claimed:
1. A cushion structure for a bicycle comprising:
a body including an inserting seat fixed on a bottom surface thereof, wherein the inserting seat of the body is formed in a circular tube shape having a center axis;
a plurality of support ribs extending diametrically through the insertion seat and the center axis and connecting with an outer rim of the body radially spaced from the inserting seat; and
a bottom tube including a connecting portion disposed on one end thereof, with the connecting portion including an inner hole corresponding to and for slideably receiving the circular tube shape and including a plurality of retaining slots receiving the plurality of support ribs outward of the circular tube shape.

2. The cushion structure for the bicycle as claimed in claim 1, wherein the inserting seat of the body is formed in a cross shape.

3. The cushion structure for the bicycle as claimed in claim 1, wherein the plurality of support ribs are formed in a cross shape.

4. The cushion structure for the bicycle as claimed in claim 1, wherein the plurality of support ribs are formed in an inverted I shape.

5. The cushion structure for the bicycle as claimed in claim 1, wherein the plurality of support ribs are formed in a radiation shape.

6. The cushion structure for the bicycle as claimed in claim 1, further comprising a fitting member of a circular tube shape and slideably receiving the connecting portion of the bottom tube with the inserting seat located concentrically within the fitting member.

7. The cushion structure for the bicycle as claimed in claim 1, wherein the bottom tube is applied with glue and connected with the inserting seat of the body.

8. The cushion structure for the bicycle as claimed in claim 1, wherein the bottom tube is connected with the inserting seat of the body in a locking manner.

9. The cushion structure for the bicycle as claimed in claim 1, wherein the bottom tube is connected with the inserting seat of the body by using a bolt and a bore to insert the bolt.

* * * * *